(12) United States Patent
Lyatkher

(10) Patent No.: US 7,586,209 B1
(45) Date of Patent: Sep. 8, 2009

(54) POWER UNIT

(76) Inventor: Victor Lyatkher, 563 Bartlow Ln., Richmond Hts., OH (US) 44143

( * ) Notice: Subject to any disclaimer, the term of this patent is extended or adjusted under 35 U.S.C. 154(b) by 0 days.

(21) Appl. No.: 12/287,998

(22) Filed: Oct. 15, 2008

(30) Foreign Application Priority Data

Mar. 28, 2008 (RU) .............................. 2008111755

(51) Int. Cl.
*F03B 13/00* (2006.01)
(52) U.S. Cl. .............................. 290/54; 290/55; 415/4.2
(58) Field of Classification Search ................... 290/54; 415/4.2
See application file for complete search history.

(56) References Cited

U.S. PATENT DOCUMENTS

| | | | | | |
|---|---|---|---|---|---|
| 4,735,382 | A | * | 4/1988 | Pinson | 244/150 |
| 4,748,808 | A | * | 6/1988 | Hill | 60/398 |
| 5,506,453 | A | * | 4/1996 | McCombs | 290/44 |
| 6,127,739 | A | * | 10/2000 | Appa | 290/55 |
| 6,278,197 | B1 | * | 8/2001 | Appa | 290/55 |
| 6,309,179 | B1 | * | 10/2001 | Holden | 415/202 |
| 6,492,743 | B1 | * | 12/2002 | Appa | 290/55 |
| 6,504,260 | B1 | * | 1/2003 | Debleser | 290/44 |
| 7,199,484 | B2 | * | 4/2007 | Brashears | 290/54 |
| 7,471,009 | B2 | * | 12/2008 | Davis et al. | 290/54 |
| 2004/0041406 | A1 | * | 3/2004 | Seki | 290/54 |
| 2006/0125243 | A1 | * | 6/2006 | Miller | 290/55 |
| 2007/0284884 | A1 | * | 12/2007 | Stothers et al. | 290/54 |
| 2008/0226450 | A1 | * | 9/2008 | Clarke et al. | 416/124 |

FOREIGN PATENT DOCUMENTS

| | | |
|---|---|---|
| RU | 2245456 | 5/2002 |
| SU | 1280178 | 12/1986 |

* cited by examiner

*Primary Examiner*—Joseph Waks

(57) ABSTRACT

An improved power unit placed in a fluid stream, comprises a common stationary hollow axle, two coaxially mounted orthogonal turbines, having hollow shafts oppositely rotatable around the axle, inner and outer rings, adjustable blades attached to the rings, an electro-generator located between the turbines including two annular rotors formed on the inner rings with flat electro-conductive rings attached thereto, circumferentially immovable bilateral inductors having a core fixed to an arm half-hingedly coupled with a frame mounted to the axle enabling axial displacement of core relatively to the rotor, a winding having a first and third coils cross-wisely wound up on the core, and a second coil transversely wound up between the first and the third coils, forming two magnetic fluxes running in the opposite directions on the opposite sides of inductor facing the rotors, and electric cables for power takeoff mounted on the frame and passed through the axle.

3 Claims, 3 Drawing Sheets

POWER UNIT

CROSS-REFERENCE TO RELATED APPLICATIONS

This U.S. patent application claims priority under 35 U.S.C. 119 (a) through (d) of a Russian Federation patent application RU2008111755 filed on 28 Mar. 2008.

FIELD OF THE INVENTION

The invention relates to the field of hydropower and wind-power engineering, particularly to large-scale constructions of low-pressure hydro-power and wind-power installations capable to convert renewable energy of water (e.g. river, tidal, etc.) steams, or atmospheric air streams (winds) into electric power.

BACKGROUND OF THE INVENTION

There is known a hydro-turbine installation, comprising two turbines horizontally and coaxially mounted in a conduit and one electro-generator (Inventor Certificate SU No 1280178, issued 30 Dec. 1986).

In the aforesaid installation, the coaxial shafts of turbines are longitudinally aligned along the conduit, and connected via a multiplying gear, placed in a hermetic capsule situated in the center of the conduit, to a vertical shaft of the generator mounted outside of the conduit. This, however, leads to inefficient use of energy of the water stream running through the cross-section of the conduit. It is conditioned by the fact that the turbines (in this case of a propeller type), operate in different periods of time, depending on the direction of the stream, and that the capsule with the gear partially blocks the stream directed along the shafts.

The closest prior art to the present invention in terms of its structure and achievable result is a power unit, comprising two coaxially mounted orthogonal turbine with blades of a hydro-dynamical profile and a three-phase linear electro-generator, the shafts of the turbines are aligned across the fluid stream, the blades are oriented in the opposite direction in relation to each other providing opposite rotation of the turbines, irrespective of the direction of the stream, and the electro-generator is located between the turbines (Patent RU2245456, issued on 20 Nov. 2003).

However the design of the aforementioned generator assumes the use of wheel supports fixing a vertical clearance between elements of the linear generator, and the inductors of the generator are joined by power electric cables supported by flexible members and mounted on the central pylon where the cables are connected to power output terminals (electric power takeoff rings). The use of the movable elements leads to a decrease of reliability of the power unit.

BRIEF GENERAL DESCRIPTION OF THE INVENTION

The present invention is directed to solving a problem of simplification of power units by means of reducing the number of movable connections, primarily, exclusion of the electric power takeoff rings. This results in improved reliability of the power units.

The specified problem is solved, and the engineering result is achieved by providing an inventive power unit placed in a fluid stream, whose preferred embodiment comprises two coaxially mounted orthogonal turbines and a three-phase electro-generator disposed between the turbines.

Each turbine includes two supporting rings (an outer ring and an inner ring). The first turbine includes a first plurality of blades mounted on its outer ring and inner ring. The second turbine includes a second plurality of blades mounted on its outer ring and inner ring. The blades have a hydro-dynamical profile with a capability of angular adjustment. Each turbine includes a hollow shaft; the shafts are aligned substantially transversely to the stream. The rings are supported by spokes fixed substantially to the corresponding shaft mounted on bearings installed on a common stationary (immovable) hollow axle. The first plurality of blades and the second plurality of blades are oriented in the opposite direction in relation to each other causing rotation of the turbines in the mutually opposite unchangeable directions, irrespective to the stream's direction. This allows for mutual compensation of the opposite reaction torques acting upon the power unit.

The electro-generator includes two short-circuited annular rotors formed on the inner rings of the turbines and respectively rotatable in the opposite directions. The rotors are represented by the inner rings and made of material capable of conducting a predetermined magnetic flux (e.g. a proper type of steel), and coupled with flat rings, which flat rings are made of material capable to conduct a predetermined electric current (e.g. aluminum or cooper). The electro-generator includes at least one bilateral inductor (further meant singular or plural) having a magnetically conductive core made immovable along the circumferential direction and fixedly attached to an arm, which arm is half-hingedly attached to a frame fixedly mounted substantially on the immovable axle, so that the arm with the core are capable of axial displacement relatively to the rotors; the inductor includes a three-phase winding composed of three phase coils, wherein a first coil and a third coil are cross-wisely disposed (wound up) on the core relatively to each other, and a second coil is transversely disposed (wound up) on the core between the first and the third coils, thereby forming two magnetic fluxes running in the opposite directions on the opposite sides of the inductor facing the opposite rotors; the electro-generator includes antifrictional pads installed in the gap between the rotor and the corresponding side of inductor, wherein the pads are supported by the arm.

The blades can be adjustably aligned perpendicularly in relation to the supporting rings between which rings they are located, or the blades can be aligned with a tilt in relation to the supporting rings, for example, making a helix line, wherein the first plurality of blades are inclined symmetrically and oppositely to the second plurality of blades.

The power unit comprises electric power cables connected to the terminals of the inductor winding, mounted on elements of the frame, and passed through the hollow axle outside of the unit.

Research has been conducted and has revealed a possibility to increase reliability of the power units with orthogonal turbines due to simplification of the design of the power unit, which is attained by means of minimizing the number of mobile mechanisms in the power unit, and by means of full exclusion of movable electric connections therein.

This is achieved due to a novel structure of the unit: two short-circuited annular rotors formed on inner rings of two orthogonal turbines rotatable in the opposite directions substantially around a common immovable hollow axle, the rotors include the inner rings and made of material capable of conducting a predetermined magnetic flux, and coupled with flat rings, made of material capable to conduct a predetermined electric current (e.g. aluminum or cooper); an electro-generator is located between the turbines and includes a number of (at least one) bilateral inductors, immovably secured along the circumferential direction, each inductor having a magnetically conductive core fixedly attached substantially to an arm half-hingedly coupled with a frame fixedly mounted to the immovable axle providing a capability of axial displacement of the arm with the core relatively to the rotor; each inductor includes a three-phase winding having three phase coils, wherein a first coil and a third coil are cross-wisely wound up on the core relatively to each other, and a second coil is transversely wound up on the core between the first and the third coils, thereby forming two magnetic fluxes running in the opposite directions on the opposite sides of the inductor facing the rotors of the opposite turbines.

Besides, the mounting of the inductors on the arm in combination with the arrangement of the antifriction pad between the rotor and the inductor allows establishing predeterminedly small air gap between the inductor and the rotor that, in turn, allows improving the overall performance of the electro-generator.

Figure 1:
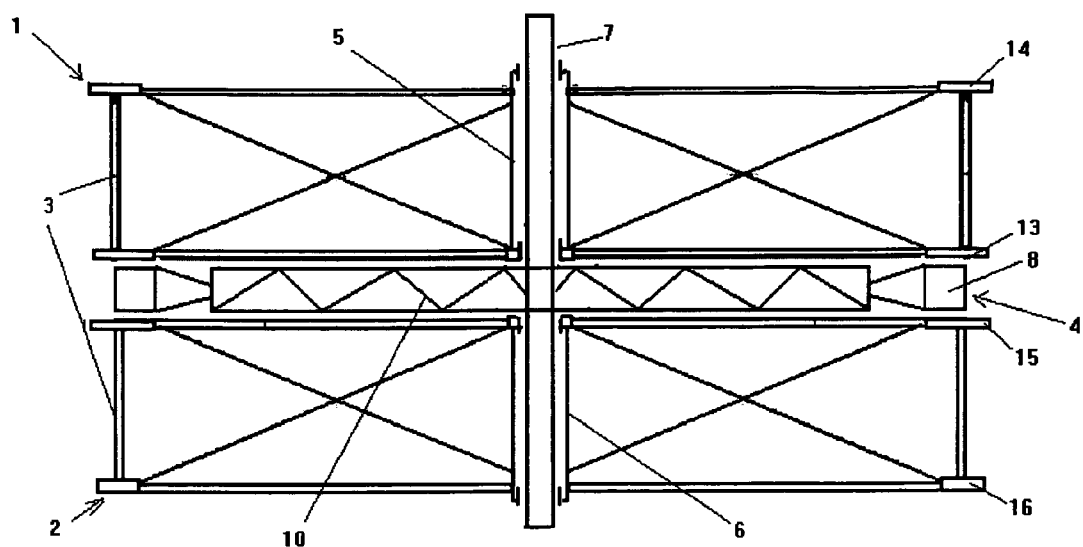
FIG. 1 is a schematic axonometric view of the power unit, according to a preferred embodiment of the invention.

Each reference numeral indicated on FIGS. 1-5 is designated to an element of the inventive structure described herein below. A first time introduced reference numeral in the description is enclosed into parentheses.

DETAIL DESCRIPTION OF A PREFERRED EMBODIMENT OF THE INVENTION

While the invention may be susceptible to embodiment in different forms, there are shown in the drawing, and will be described in detail herein, specific embodiments of the present invention, with the understanding that the present disclosure is to be considered an exemplification of the principles of the invention, and is not intended to limit the invention to that as illustrated and described herein.

In a preferred embodiment shown on FIGS. 1-5, the inventive power unit comprises two coaxially mounted orthogonal turbines (1) and (2) substantially transversely placed into a fluid stream, and a three-phase electro-generator (4) disposed between the turbines.

The turbine 1 includes an inner supporting ring (13) and an outer supporting ring (14), furnished with a first plurality of blades (3); and the turbine 2 includes an inner supporting ring (15) and an outer supporting ring (16), furnished with a second plurality of blades (3). The blades 3 have a hydro-dynamical profile and mounted on the supporting rings with a capability of angular adjustment. The first plurality of blades 3 are oriented in the opposite direction in relation to the second plurality of blades 3 (illustrated on FIG. 3) causing rotation of the turbines 1 and 2 in the mutually opposite unchangeable directions, irrespective to the stream's direction.

As depicted on FIG. 1, the turbine 1 includes a hollow shaft (5), and the turbine 2 includes a hollow shaft (6); the shafts are aligned across the stream. The supporting rings 13-16 are supported by spokes fixed substantially to the corresponding shaft 5 or 6, mounted on bearings installed on a common stationary (immovable) hollow axle (7).

The electro-generator 4 includes a first short-circuited annular rotor includes the inner ring 13 of the turbine 1 and a second short-circuited annular rotor includes the inner ring 15 of the turbine 2, the first and second rotors are rotatable in the opposite directions. The rotors are made of material capable of conducting a predetermined magnetic flux (e.g. a proper type of steel). The rotors include flat rings (17), illustrated on FIGS. 4, 5, made of material capable to conduct a predetermined electric current (e.g. aluminum or cooper), and inwardly fixedly disposed on the inward side of the corresponding inner rings.

Figure 2:
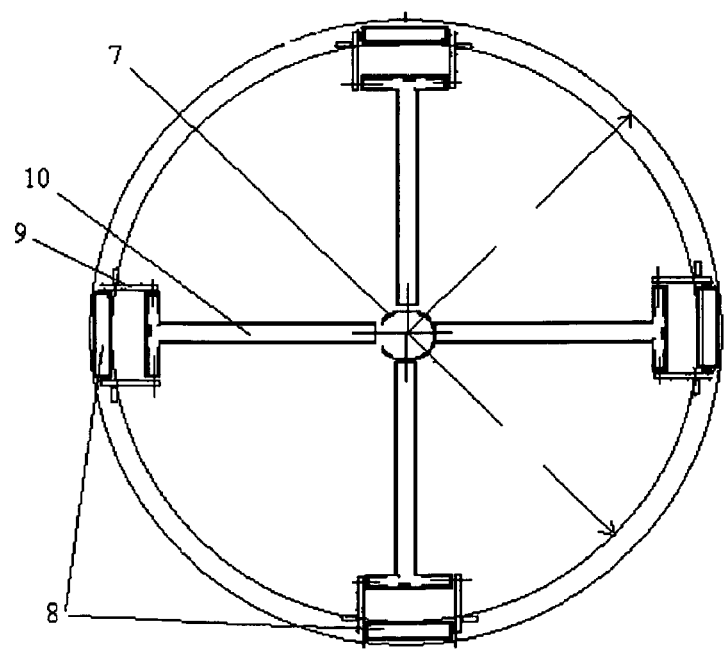
FIG. 2 is a schematic sectional view of the power unit at the place of attachment of four frames with four arms, according to the preferred embodiment of the invention.
Figure 3:
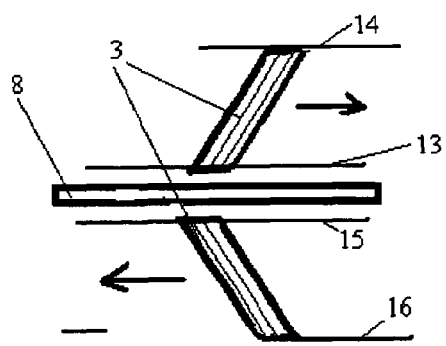
FIG. 3 is a schematic view of the blades inclined relatively to the supporting rings, according to the preferred embodiment of the invention.
Figure 4:
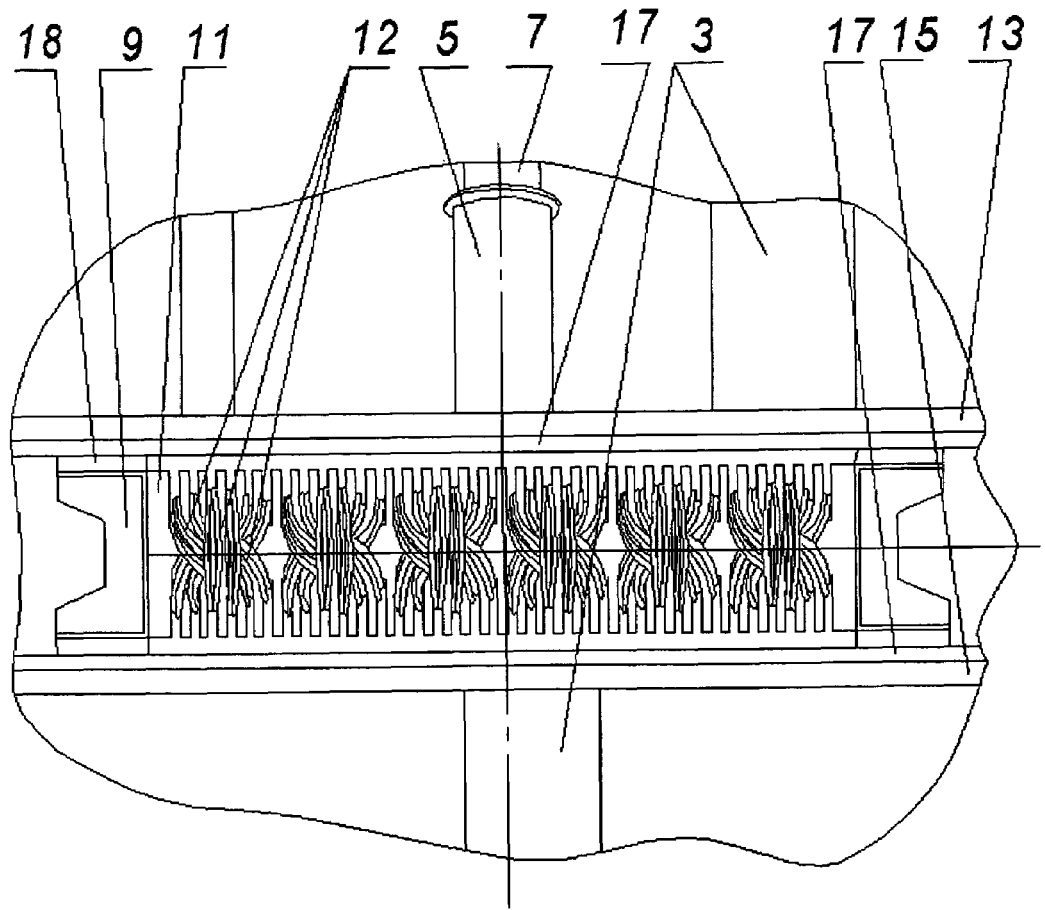
FIG. 4 is a partial sectional view of the inductor with cross-wisely disposed phase coils, according to the preferred embodiment of the invention.
Figure 5:
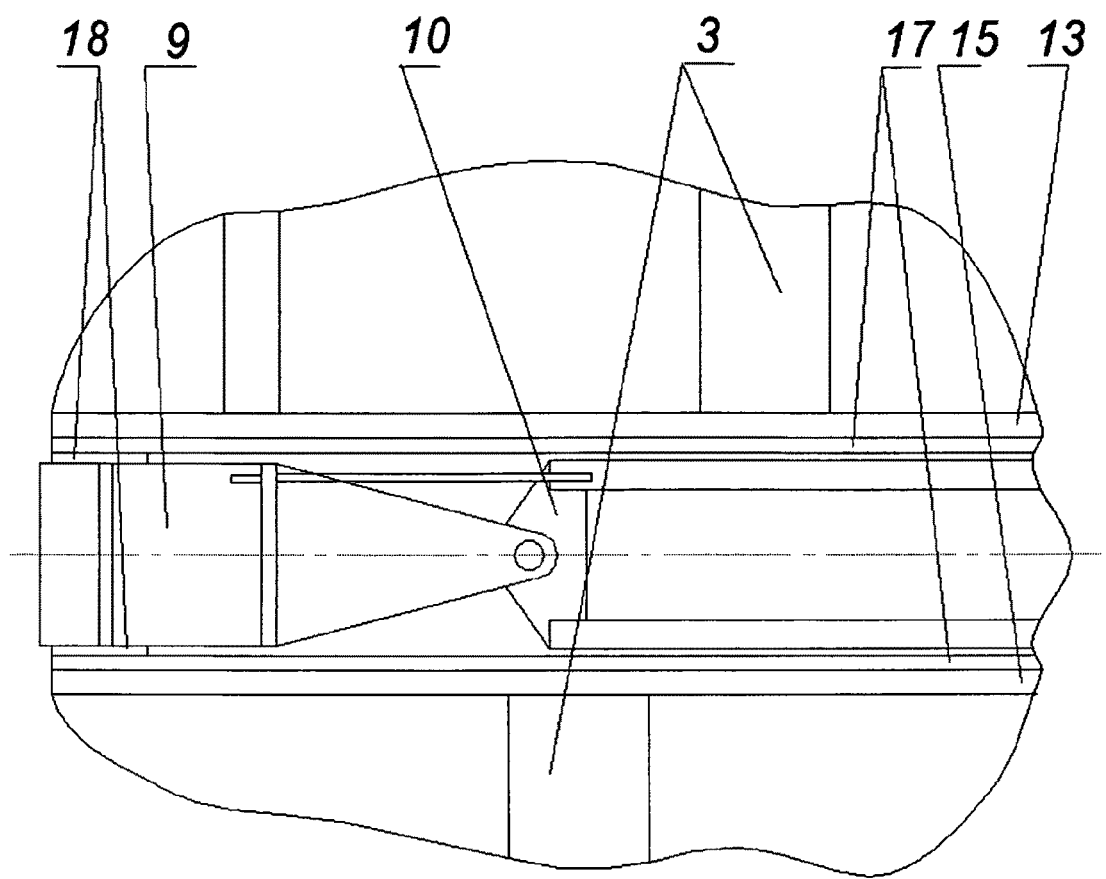
FIG. 5 is a partial sectional view of elements of the elector-generator at the place of mounting of the frame installed on the arm, according to the preferred embodiment of the invention.

The electro-generator 4, shown on FIGS. 1-2, includes four bilateral inductors (8) made circumferentially immovable; each inductor 8 includes a magnetically conductive core (11) fixedly attached to an arm (9), whereas the arm 9 is half-hingedly attached (illustrated on FIG. 5) to a frame (10) fixedly mounted substantially on the stationary axle 7. Thus, the arm 9 with the core 11 are capable of axial displacement relatively to the rotors of turbines 1 and 2. The inductor 8 includes a three-phase winding (12) composed of three phase coils (illustrated on FIG. 4), wherein a first and a third coils are cross-wisely wound up on the core relatively to each other, and a second coil is transversely disposed wound up on the core between the first and the third coils, thereby forming two magnetic fluxes running in the opposite directions on the opposite sides of the inductor 8 facing the opposite rotors of rings 13 and 15. The electro-generator 4 includes anti-frictional pads (18) installed in the gaps between each rotor and the corresponding side of inductor 8, wherein the pads 18 are supported by the arms 9.

The blades 3 can be adjustably aligned perpendicularly in relation to the supporting rings 13 and 14, or 15 and 16, between which rings they are located, or the blades 3 can be aligned with a tilt in relation to the supporting rings, for example, making a helix line, wherein the blades of turbine 1 are inclined symmetrically and oppositely to the blades of turbine 2.

The power unit comprises electric power cables (not illustrated) connected to the terminals of the inductor windings 12, mounted on elements of the immovable frame 10, and passed through the hollow axle 7 outside of the unit.

An example of operation of the inventive power unit can be described as follows.

Due to the action of the fluid stream (e.g. wind, or a water stream when the unit is placed in a river or in a tidal flow) upon the turbines 1 and 2, the turbines with their respective rotors start rotating in the opposite directions. As a result of the rotation of the rotors relatively to the bilateral inductors 8, the electro-generator 4 generates electric energy which is transmitted via the cables to consumers.

The present invention can be deployed for design of non-polluting power units to be installed in rivers, in tidal flow places, or on wind power plants.

I claim:

1. A power unit placed in a fluid stream, comprising:
    a common stationary hollow axle;
    a first orthogonal turbine and a second orthogonal turbine, coaxially mounted in relation to each other;

each said turbine including
- an outer supporting ring, an inner supporting ring, a first plurality of blades mounted on the inner and outer rings of the first turbine, a second plurality of blades mounted on the inner and outer rings of the second turbine, and a hollow shaft rotatable substantially around said axle;
- wherein the shafts are aligned substantially transversely to the stream, and essentially support the respective supporting rings; the blades having a hydro-dynamical profile with a capability of angular adjustment; said first plurality of blades and said second plurality of blades are oriented symmetrically in the opposite directions in relation to each other causing rotation of the turbines in the mutually opposite unchangeable directions irrespective to the stream's direction; and an electro-generator, disposed between the turbines, including
- two short-circuited annular rotors including the inner rings of the turbines; said inner rings are made of material capable of conducting a predetermined magnetic flux, said rotors including flat rings, inwardly attached to the corresponding inner rings, said flat rings are made of material capable to conduct a predetermined electric current;
- at least one bilateral inductor including
  - a magnetically conductive core,
  - an arm made immovable along the circumferential direction and fixedly attached to said core,
  - a frame fixedly mounted substantially on said axle and half-hingedly attached to said arm, so that the arm with the core are capable of axial displacement relatively to the rotors;
  - a three-phase winding composed of three phase coils, wherein a first coil and a third coil are cross-wisely wound up on said core relatively to each other, and a second coil is transversely wound up on said core between the first and the third coils, thereby forming two magnetic fluxes running in the opposite directions on the opposite sides of said inductor facing the opposite rotors; and
  - anti-frictional pads installed in the gap between the rotor and the corresponding side of said inductor, wherein the pads are supported by said arm.

2. The unit according to claim 1, wherein said blades are aligned perpendicularly in relation to the respective supporting rings, which they are mounted on.

3. The unit according to claim 1, wherein said blades are aligned with a tilt in relation to the respective supporting rings, between which they are mounted on.

* * * * *